United States Patent

Efflandt

[15] 3,648,445

[45] Mar. 14, 1972

[54] ROTARY MOWER SAFETY CHUTE OUTLET

[72] Inventor: James F. Efflandt, Milwaukee, Wis.

[73] Assignee: Outboard Marine Corporation, Waukegan, Ill.

[22] Filed: Oct. 26, 1970

[21] Appl. No.: 83,783

[52] U.S. Cl. ........................................................56/320.2
[51] Int. Cl. .........................................................A01d 55/18
[58] Field of Search................56/17.4, 17.5, 255, 295, 320.2

[56] References Cited

UNITED STATES PATENTS

| | | | |
|---|---|---|---|
| 3,220,170 | 11/1965 | Smith........................................56/255 |
| 3,420,041 | 1/1969 | Irgens.....................................56/320.2 |
| 3,453,812 | 7/1969 | Heidner et al. .......................56/320.2 |
| 3,509,703 | 5/1970 | Kunz........................................56/17.4 |
| 3,503,194 | 3/1970 | Ritums....................................56/255 |
| 3,568,421 | 3/1971 | Smith et al.............................56/255 |

Primary Examiner—Russell R. Kinsey
Attorney—Wheeler, Wheeler, House & Clemency and Robert K. Gerling

[57] ABSTRACT

Disclosed herein is a blade housing for a lawn mower having a vertically extending sidewall and a top deck including a main portion and a chute portion extending from the top deck main portion and arcuately about the axis of intended blade rotation and then generally tangentially outwardly from the sidewall. The chute portion includes a top wall having, about the plane of intended blade rotation, a height which gradually increases in the direction of intended blade rotation. The blade housing also includes means for preventing such discharge from the chute portion of objects which could cause injury to persons, such means comprising a surface extending upwardly and outwardly from below the plane of intended blade rotation to form a chute bottom wall, together with the provision of a terminal portion of the chute top wall, which portion extends outwardly and downwardly from beyond the outer end of the surface for cooperation with the surface so as to block such discharge.

4 Claims, 3 Drawing Figures

PATENTED MAR 14 1972　3,648,445

Inventor
James F. Efflandt
By
Wheeler, Wheeler, House & Clemency
Attorneys

ROTARY MOWER SAFETY CHUTE OUTLET

BACKGROUND OF THE INVENTION

Blade housings for rotary lawn mowers have conventionally included open side discharge outlets permitting outward straight line delivery of exiting particles at high velocities, and therefor exposing the operator and others nearby to possible injury. In many prior constructions, it was also possible for exiting particles to travel upwardly, as well as outwardly, thereby further increasing the possibility of such particles producing injury to persons nearby or to the operator of the lawn mower. One example of such type of construction is shown in the Kuntz U.S. Pat. No. 3,509,703 issued May 5, 1970.

Other examples of known prior constructions include the construction shown in the Shaw U.S. Pat. No. 3,118,267 issued Jan. 21, 1964 and the construction shown in the Irgens U.S. Pat. No. 3,420,041 issued Jan. 7, 1969.

SUMMARY OF THE INVENTION

The invention provides a cutting blade housing for a rotary lawn mower, which housing affords increased operational safety by effecting downward discharge of exiting particles.

The invention also provides a cutting blade housing for a rotary lawn mower wherein the housing includes an upwardly and arcuately and then tangentially extending chute which includes means for blocking straight line discharge of particles from the blade housing.

In accordance with the invention, such blocking means comprises formation of the chute with a bottom wall which extends upwardly and outwardly from below the plane of intended blade rotation, together with the formation of the top wall of the chute with a terminal part or portion which extends outwardly and downwardly beyond the chute bottom wall, whereby to cause exiting particles to travel upwardly through the chute and against the terminal portion for downward deflection toward the ground. In the preferred embodiment of the invention, the chute bottom wall extends from a reduced height portion of a housing side wall which extends continuously adjacent to the periphery of the path of blade rotation.

One of the principal objects of the invention is the provision of a safer lawn mower housing and in particular to provide a safe discharge chute.

Another principal object of the invention is the provision of a rotary mower housing having a chute configuration which deflects exiting air and grass downwardly for distribution of clippings on the ground without allowing easy exit of thrown objects at high velocity.

Another principal object of the invention is the provision of a rotary lawn mower housing including an arcuate and tangentially extending chute portion arranged for side discharge in such manner as to prevent exiting particles from being discharged in such manner as could cause personal injury to the operator or to a bystander.

Another principal object of the invention is the provision of a rotary mower blade housing including an upwardly and arcuately and tangentially extending chute having a bottom wall forcing upward flow of exiting particles and having a chute top wall terminal portion extending outwardly and downwardly from beyond the outer edge of the chute bottom wall to cause downward deflection of the exiting particles.

Another of the principal objects of the invention is the provision of a unitary or one-piece blade housing including means for affecting side discharge of exiting particles in such manner as to effect discharge in a downward direction and thereby to block such upward and outward discharge as could otherwise cause injury to the operator or to a bystander.

Another principal object of the invention is the provision of a lawn mower blade housing having a continuous vertical side wall adjacent to the periphery of the path of intended blade travel, the side wall having a portion of reduced height extending in transverse underlying relation to an upwardly extending and arcuately and then tangentially extending chute and having an upper edge approximately at the height of the plane of intended blade rotation.

Another principal object of the invention is the provision of a resilient boot or chute extension for causing downward deflection of exiting particles at reduced velocities.

Other objects and advantages of the invention include the provision of a one-piece rotary mower blade housing which includes an upwardly arcuately and tangentially extending chute with means for blocking straight line discharge from the housing, which can be economically manufactured, and which will provide reliable service over a long and useful life.

Other objects and advantages of the invention will become known by reference to the following description and accompanying drawings.

DRAWINGS

GENERAL DESCRIPTION

Figure 1:
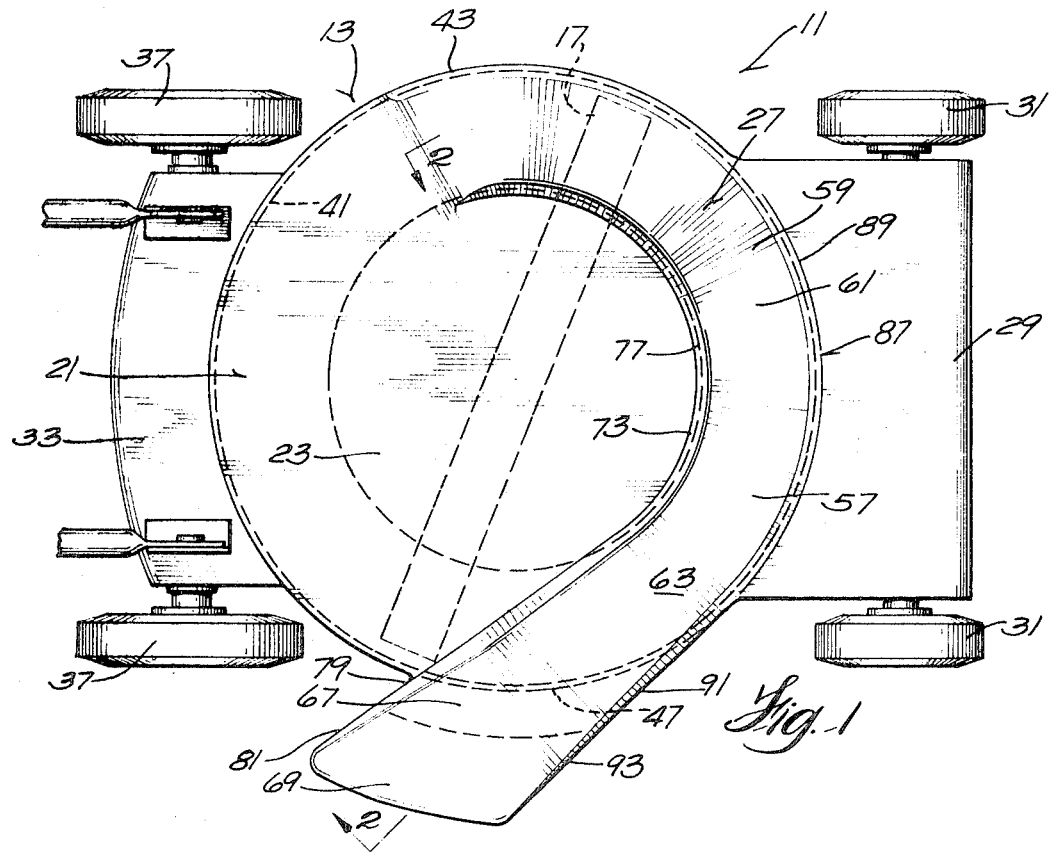
FIG. 1 is a top view of a lawn mower embodying various of the features of the invention.
Figure 2:
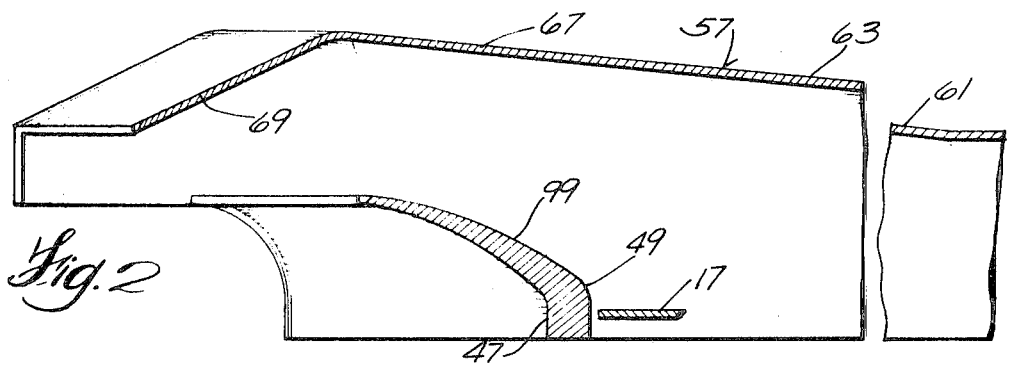
FIG. 2 is an enlarged sectional view taken along line 2—2 of FIG. 1.

Fragmentarily shown in the drawings is a rotary lawn mower 11 having a cutter blade housing 13 which is supported on the ground by suitable wheel means and which supports an engine (not shown) arranged to drive a cutter blade 17 about a vertical axis in a generally horizontal plane.

The housing 13 includes a top deck 21 having a main portion 23 which can be arranged to support the engine and a chute portion 27 which extends from the main portion 23 and arcuately about the vertical axis of blade rotation. The housing 13 also includes a front deck 29 which is located forwardly of the chute portion 27 and suitably supports front wheels 31. Also forming a part of the housing 13 is a rear deck 33 which is generally located rearwardly of the main portion 23 of the top deck 21 and which suitably supports rear wheels 37 and has connections for a handle for facilitating movement of the mower along the ground.

The housing 13 also includes a continuous side wall 41 which extends vertically downwardly from the top deck 21 and peripherally around the entire path of the tip of the cutter blade 17. More specifically, the peripherally continuous, vertically extending side wall 41 includes a main portion 43 extending from about 2 o'clock to about 12 o'clock (considering 12 o'clock to be at the front of the housing 13) and a portion of reduced height 47 which extends from about 12 o'clock to about 2 o'clock and which has an upper edge or margin 49 located approximately in the plane of intended blade rotation.

Still more particularly, in the construction disclosed in the drawings, the main portion 23 of the top deck 21 extends rearwardly from the chute portion 27 and at the depending side wall 41 in the area from about 2 0'clock to about 9 o'clock.

The chute portion 27 extends forwardly of the top deck main portion 23 and from the side wall 41 in the area from about 9 o'clock to about 2 o'clock. More specifically, the chute portion 27 includes a top wall 57 having a first part 59 with a first portion 61 which extends from the top deck main portion 23 at about 9 o'clock and arcuately to about 12 o'clock. The first part 59 of the top wall 57 of the chute portion 27 also includes a second portion 63 which extends from the first portion 61 generally tangentially and slightly rearwardly to approximately a vertical projection from the side wall portion 47 of reduced height. Throughout the arcuate and tangential length thereof, the first part 59 of the top wall 57 of the chute portion 27 gradually increases in height above the plane of intended blade rotation in the direction of intended blade rotation.

The chute top wall 57 further includes a second part 67 which extends generally tangentially outwardly from a vertical projection from the side wall portion 47 of reduced height and forms a continuation of the tangentially extending second portion 63 of the chute top wall first part 59 and which includes, as will be further mentioned, a terminal portion 69 extending downwardly and outwardly from the remaining portion of the chute portion top wall second part 67.

The chute portion 27 further includes an outer side wall 87 having a vertically and arcuately extending first part 89 connecting the part of the side wall main portion 43 between about 9 o'clock and about 12 o'clock to the first part 59 of the top wall 57 of the chute portion 27 and a second part 91 which extends from the second part 67 of the top wall 57 of the chute portion 27 and from the first part 89 of the outer side wall 87 in generally outwardly and tangential relation to the housing side wall 41. The second part 91 of the outer side wall 87 also includes a terminal portion 93 which extends outwardly to adjacent the end of the terminal portion 69 of the chute top wall 57.

Still further, the chute portion 27 also includes an inner side wall 73 which has an arcuately and vertically extending first part 77 connecting the top deck main portion 23 to the first part 59 of the top wall 57 of the chute portion 27. In addition, the inner side wall 73 has a generally vertically extending second part 79 which extends from the first part 77 of the inner side wall 73 and from the second part 67 of the top wall 57 of the chute portion 27 and generally outwardly of said housing side wall in slightly outwardly flaring relation to the outer side wall 87. The second part 79 of the inner side wall includes a terminal portion 81 which extends in somewhat outwardly flaring relation to the terminal portion 93 of the outer side wall 87 and which extends outwardly to adjacent the end of the terminal portion 69 of the chute top wall 57.

In accordance with the invention, the chute portion 27 and the housing side wall 41 are arranged to prevent such high velocity discharge of objects from the blade housing 13 as might cause injury to the operator or other persons nearby. In this regard, means are provided for preventing discharge from the chute portion 27 of objects which could cause personal injury.

More particularly, in accordance with the invention, the chute portion 27 and the side wall 41 in the area between about 12 o'clock and 2 o'clock are arranged to prevent high velocity direct discharge of objects from the blade housing 13 as might cause injury to the operator or others nearby. In other words, the chute portion 27 and the side wall 41 are arranged to prevent direct discharge of objects along a straight path. More specifically, the arrangement of the chute portion 27 and the side wall 41 is such as to block direct or straight line discharge of exiting particles and desirably to deflect such exiting particles downwardly toward the ground.

In accordance with the invention, such means comprises the previously mentioned side wall portion 47 or reduced height which constitutes a barrier wall against unwanted direct horizontal ejection of particles from the housing and which extends between about 12 o'clock and about 2 o'clock and upwardly to adjacent to the plane of intended blade rotation, together with a surface 99 which extends upwardly and outwardly from the upper edge 49 of the side wall portion 47 of the reduced height to form a chute bottom wall between at least a portion of the inner and outer side wall second parts 79 and 91, respectively, and inwardly of the respective terminal portions 81 and 93 thereof. Such means also includes the before-mentioned terminal portion 69 of the second part 67 of the top wall 57 of the chute portion 27, which terminal portion 69 extends downwardly and outwardly from beyond the outer end of the surface 99 which forms a partial bottom to the chute, whereby to cooperate with the surface 99 and the side wall portion of reduced height 47 to block such discharge of objects as could cause injury to persons. In addition, the side wall terminal portions 81 and 93 extending beyond the outer end of the surface 99 constituting a chute bottom wall, also serve to prevent direct or straight line discharge from the blade housing 13.

In operation, any particles being discharged from the housing 13 are forced to travel upwardly through the chute portion 27 because of the inclusion of the continuously extending side wall 41 and particularly because of the inclusion of the side wall portion 47 of reduced height extending between about 12 o'clock and 2 o'clock. In addition, because of the upward and outward disposition of the surface 99 extending from the upper edge 49 of the side wall portion 47 of reduced height, the exiting particles are forced to travel upwardly along a path which will bring them into contact with either the outer terminal portions 81 and 93 of the chute side walls 73 and 87 or with the terminal portion 69 of the second part 67 of the top wall 57 of the chute portion 27, so as to cause downward deflection of the exiting particles toward the ground in the area outwardly of the outer end of the chute formed by the surface 99. As a consequence, the exiting particles are caused to deflect against either the side walls or the top wall of the chute portion and to travel from the point of deflection with the top wall downwardly toward the ground, thereby preventing unwanted discharge of articles upwardly and toward nearby persons. Thus, the exit path provided by the disclosed construction will not allow exit of objects at high velocity because either the lower barrier wall 47 or the chute extension 101 or the terminal end of the chute portion 27 will interfere with the outlet trajectory of the objects and will effectively slow down the velocity of the objects on their way out of the chute. Furthermore, a construction such as disclosed herein allows the use of the side shield on the chute side of the mower, as well as a side shield on the opposite side to limit exiting of objects under the sides of the housing. It should be understood that the chute portion can extend for greater or lesser arcuate distances than from about 9 o'clock to about 2 o'clock and that the chute portion, as a whole, can be rotated relative to the axis of the blade to positions other than as shown in the drawing.

It should also be noted that the second part of the inner and outer chute side walls 73 and 87 include the terminal portions 81 and 93 which extend beyond the outer end of the chute bottom wall or surface 99 to approximately the end of the terminal portion 69 of the chute top wall 57 so as to prevent stray injection of particles which might be traveling at a sufficient angle relative to the centerline of the chute portion 27 so as to permit escape without contacting the downwardly depending terminal portion 69 of the chute top wall 57.

Figure 3:
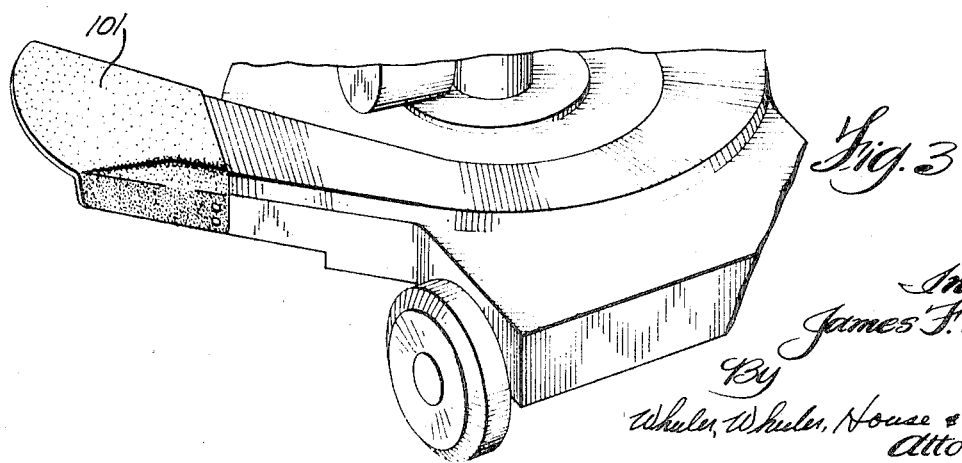
FIG. 3 is a perspective view of a modified lawn mower embodying various of the features of the invention.

While certain of the advantages of the invention can be obtained by fabricating the housing as a one-piece structure, the invention also contemplates formation of the terminal portions 69, 81, and 93 of the chute 27 from a separate boot, extension, or terminal member, or piece 101 (See FIG. 3) of resilient material and suitably attaching the terminal piece 101 to the outer end of the chute portion 27. The use of such a resilient terminal member 101 can be helpful both from the viewpoint of providing dies for casting the housing 13 and from the viewpoint of cushioning the impact of discharged objects and absorbing energy therefrom so as to decrease their velocity and of deflecting such objects toward the ground. If desired, the chute can be arranged for grass catching by detaching the extension member 101 and by suitably attaching a grass catcher in lieu of the extension member 101.

It should be understood that the safety feature provided by the outer terminal portion of the chute can be employed in connection with other arrangements for preventing discharge of particles from under the housing so as to provide a lawn mower which includes overall protection against unwanted discharge of particles in such manner as could cause injury to the operator or bystanders. The configuration of the chute also prevents insertion of hands or feet through the chute into the path of the blade.

Various of the features of the invention are set forth in the following claims.

What is claimed is:

1. A blade housing for a lawn mower having a blade rotating about a vertical axis, said blade housing having a vertically extending side wall extending around the periphery of the intended path of blade rotation, said blade housing also having a top deck including a main portion, and a chute portion which extends arcuately from the main portion about the axis of intended blade rotation and then generally tangentially outwardly, said chute portion including inner and outer side walls connected to a top wall which gradually increases in height above the plane of intended blade rotation in the direction of intended blade rotation, and said blade housing also including means for downwardly deflecting discharge from said chute portion of objects which could otherwise cause injury to persons, said means comprising a surface extending upwardly and outwardly from about the plane of intended rotation of said blade and between said inner and outer chute portion side walls to form a chute bottom wall, and the inclusion in said chute portion top wall of a terminal part extending outwardly and downwardly from beyond the outer end of the said surface for cooperation with said surface so as to downwardly deflect exiting objects.

2. A blade housing in accordance with claim 1 wherein said vertically extending side wall extends continuously around the periphery of the intended path of blade rotation and includes a main portion and an arcuately extending second portion of reduced height which merges at its ends with said main portion and which is located beneath said chute portion and has an upper edge located approximately in the plane of intended blade rotation and wherein said surface extends from said side wall portion of reduced height.

3. A blade housing in accordance with claim 1 wherein said chute top wall and said inner and outer chute side walls each include terminal portions which are fabricated of resilient material.

4. A blade housing for a lawn mower having a blade rotating about a vertical axis, said blade housing having a vertically extending side wall extending continuously around the periphery of the intended path of blade rotation and including a main portion, and a portion of reduced height having an upper edge located approximately in the plane of intended blade rotation, said blade housing also having a top deck including a main portion extending from a part of said side wall main portion, and a chute portion extending from the remaining part of said side wall main portion and from said top deck main portion and arcuately about the axis of intended blade rotation and then generally tangentially outwardly from said side wall, said chute portion including a top wall including a first part extending from said top deck main portion and approximately to a vertical projection of said housing side wall, said first part of said top wall having above the plane of intended blade rotation a height which gradually increases in the direction of intended blade rotation, said top wall including a second part which extends from said first part generally tangentially outwardly of said housing side wall, said chute portion also including an inner side wall having a first part connecting said top wall first part to said top deck main portion, and a second part extending from said inner side wall first part and from said second part of said top wall generally outwardly of said housing side wall, and said chute portion also including an outer side wall having a first part connecting said top wall first part to said remaining part of said side wall main portion, and a second part extending from said top wall second part and from said outer side wall first part generally tangentially outwardly of said housing side wall, and said blade housing also including means for preventing such discharge from said chute portion of objects which could cause injury to persons, said means comprising said side wall portion of reduced height, a surface extending upwardly and outwardly from said side wall portion of reduced height to form a chute bottom wall between said inner and outer side wall second parts, and the inclusion in said chute portion top wall second part of a terminal part extending outwardly and downwardly from beyond the outer end of said surface for cooperation with said surface so as to block such discharge of objects as could cause injury to persons.

* * * * *